United States Patent
Mildner

(10) Patent No.: US 8,814,248 B2
(45) Date of Patent: Aug. 26, 2014

(54) MOTOR VEHICLE BODY WITH REINFORCING STRUCTURE

(71) Applicant: GM Global Technology Operations LLC, Detroit, MI (US)

(72) Inventor: Udo Mildner, Limburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/725,111

(22) Filed: Dec. 21, 2012

(65) Prior Publication Data

US 2013/0161981 A1 Jun. 27, 2013

(30) Foreign Application Priority Data

Dec. 22, 2011 (DE) .......... 10 2011 121 908

(51) Int. Cl.
*B62J 25/00* (2006.01)

(52) U.S. Cl.
USPC .... 296/75; 296/193.07; 296/204; 296/187.08

(58) Field of Classification Search
USPC .......... 296/75, 193.07, 204, 187.08, 29, 30, 296/187.09, 187.12
See application file for complete search history.

(56) References Cited

U.S. PATENT DOCUMENTS

| | | | |
|---|---|---|---|
| 4,652,044 A | 3/1987 | Harasaki | |
| 4,789,199 A | 12/1988 | Komatsu | |
| 5,011,201 A | 4/1991 | Takahashi et al. | |
| 5,388,885 A | 2/1995 | Warren | |
| 5,560,674 A | 10/1996 | Tazaki et al. | |
| 5,882,065 A * | 3/1999 | Koiwa et al. | 296/203.02 |
| 6,299,237 B1 | 10/2001 | Benz et al. | |
| 6,547,318 B2 * | 4/2003 | Takeuchi | 296/204 |
| 6,666,501 B1 | 12/2003 | Logan et al. | |
| 7,059,667 B2 | 6/2006 | Tomita | |

FOREIGN PATENT DOCUMENTS

| | | |
|---|---|---|
| DE | 10001102 A1 | 7/2001 |
| DE | 102009049113 A1 | 4/2011 |
| GB | 2485449 A | 5/2012 |

OTHER PUBLICATIONS

German Patent Office, German Search Report for Application No. 102011121908.4, dated Aug. 7, 2012.

* cited by examiner

*Primary Examiner* — Joseph Pape
(74) *Attorney, Agent, or Firm* — Ingrassia Fisher & Lorenz, P.C.

(57) ABSTRACT

A motor vehicle body having at least one side member located on the front side in front of a front wall is provided. The motor vehicle body having a first reinforcing element adjoining thereon in longitudinal direction, which, following the contour of a wheel housing panel, protrudes in vehicle transverse direction to the outside and which supports itself on a floor structure via second reinforcing element, which is arranged spaced from a lateral front wall portion adjoining the wheel housing panel.

20 Claims, 6 Drawing Sheets

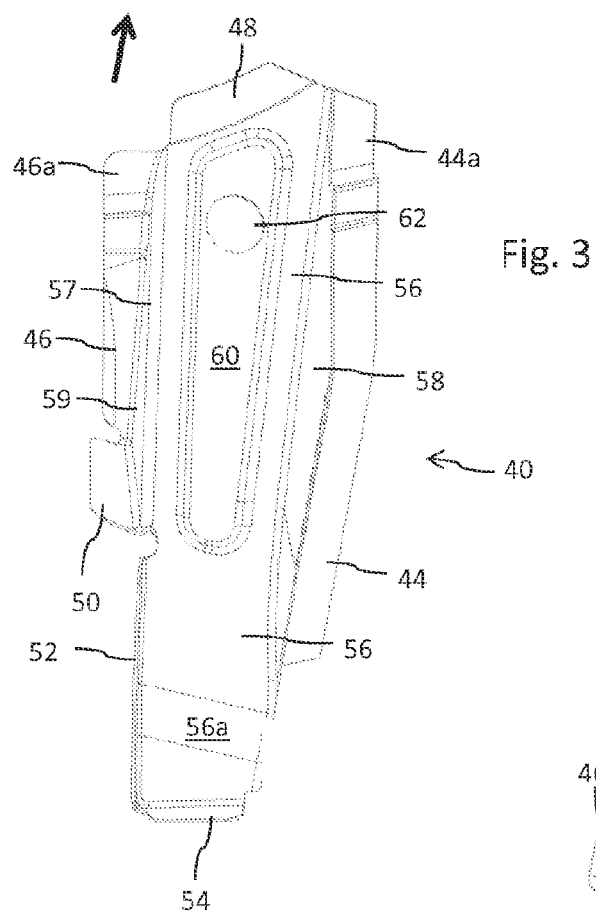
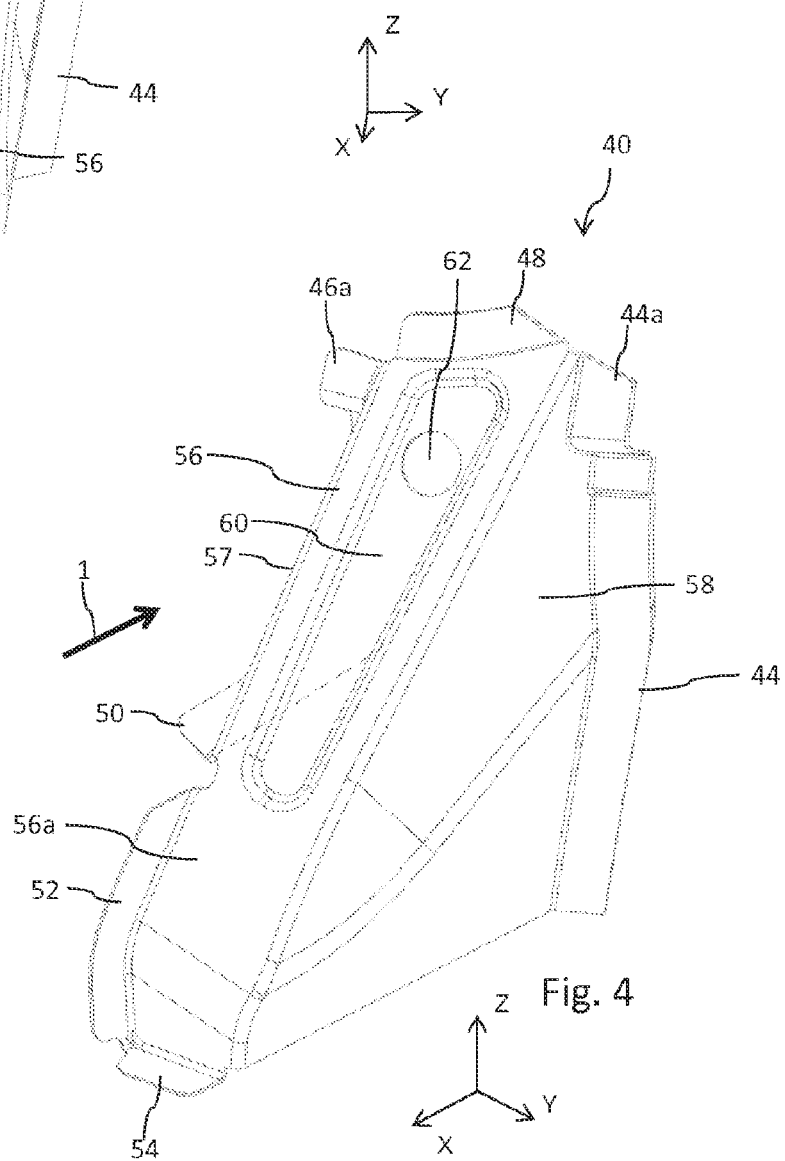

A-A

B-B

MOTOR VEHICLE BODY WITH REINFORCING STRUCTURE

CROSS-REFERENCE TO RELATED APPLICATION

This application claims priority to German Patent Application No. 10 2011 121 908.4, filed Dec. 22, 2011, which is incorporated herein by reference in its entirety.

TECHNICAL FIELD

The present disclosure relates to a motor vehicle body, in particular a front structure of a body with structure-reinforcing means in the transition region between a front frame structure and a front or separating wall, which bounds a passenger cell of the motor vehicle towards the front, towards the engine compartment.

BACKGROUND

Self-supporting motor vehicle bodies typically comprise a front frame which in travelling direction of the motor vehicle is positioned in front of the passenger cell with lateral front side members substantially extending in vehicle longitudinal direction. Here, the side members are connected structurally, i.e. in force and load path-transmitting manner to a front wall cross member and/or to lateral sills substantially extending in vehicle longitudinal direction in the region of a front wall separating the passenger cell and the engine compartment located in front.

In the transition region, a wheel housing with a wheel housing or wheel installation panel laterally adjoining the front wall is provided, which is usually designed curved towards the inside. The wheel housing panel extends towards the vehicle outside as far as to a lateral front wall portion which forms a type of side wall. For the structural reinforcement of the front frame connection, a reinforcing structure, for example in the form of a reinforcing panel adapted to the profile of the wheel installation or to the profile of the front wall panel can be provided.

Thus, a body-in-white of a motor vehicle with a front-end structure is known for example from DE 199 26 352 B4, which comprises lower front-end side members and upper side members. Each of these is followed by a spring strut bracket, which leads into lateral A-pillars, which are connected to lateral longitudinal sills of the passenger sill towards the bottom. Here, a composite brace arrangement each is provided on both vehicle sides, which extends between the upper side member and the assigned lateral longitudinal sill obliquely towards the bottom in vehicle vertical direction as well as to the back in vehicle longitudinal direction.

Side member, sill, A-pillar extension and the front side member in this case are substantially located in a common plane oriented in vehicle longitudinal and vehicle vertical direction.

Therefore, it may be desirable to improve the structural stiffness of the motor vehicle body, in particular in the transition region of front frame and front wall and in the process increase its resistance to laterally acting forces, for example in the case of a laterally offset frontal impact. In addition, it may be desirable to lower the vehicle weight and optimize and installation space distribution of the motor vehicle. In addition, other objects, desirable features and characteristics will become apparent from the subsequent summary and detailed description, and the appended claims, taken in conjunction with the accompanying drawings and this background.

SUMMARY

In one example, a motor vehicle comprises at least one side member substantially extending in vehicle longitudinal direction and with respect to the travelling direction of the motor vehicle, located on the front side in front of a front wall. A reinforcing element adjoins the side member in longitudinal direction in the direction of the vehicle rear, which following the profile of a wheel housing panel projects to the outside in vehicle transverse direction and which supports itself towards the bottom on a floor structure via a second reinforcing element, which is arranged spaced from a lateral front wall portion adjoining the wheel housing panel.

While the first reinforcing element adjoins the front side member opposite to the travelling direction and thus forms a type of frame head support which leads the load path formed by the side member in vehicle transverse direction towards the outside, to a lateral front wall portion, the second reinforcing element forms a bracing support generally running obliquely downwards, which subject to maintaining a predetermined distance to the rear end portion of the first reinforcing element protruding to the outside structurally connected to the first reinforcing element.

The lateral front wall portion generally extends into a plane formed by vehicle longitudinal direction and vehicle vertical direction, in which an end portion of the first reinforcing element facing away from the travelling direction of the motor vehicle comes to lie. In that the second reinforcing element now contacts the first reinforcing element in one example offset towards the inside relative to the front wall portion, a defined intermediate space can be formed between the lateral front wall portion and the second reinforcing element, which may be advantageous for an arrangement or for an installation of further function components or components of the motor vehicle as well as with respect to the assembly, in one example, for the accessibility of fastening or connecting tools, such as for example welding tongs.

The second reinforcing element is generally arranged laterally offset relative to the extension of the side member or offset relative to a side member or front frame extension adjoining the side member in vehicle longitudinal direction. Because of this, in particular the region of the first reinforcing element protruding in vehicle transverse direction to the outside can be structurally stabilized by means of the second reinforcing element, so that the structural stiffness of the motor vehicle body, in particular in the transition region from the front side member to the vehicle front wall or in the transition region from the front side member and lateral sills coming to lie laterally offset thereto can be increased in a generally advantageous manner.

Through the shaping of the first reinforcing element protruding to the outside and its support via the second reinforcing element protruding downwards, an improvement of the body stiffness in the case of a laterally offset frontal impact can also be achieved, so that the intrusion of the vehicle front wall, in particular of the lateral region or portion of the vehicle front wall can be significantly reduced.

According to one exemplary embodiment, the second reinforcing element supports itself on a lateral sill with a flange protruding in vehicle transverse direction to the outside and substantially extending in vehicle longitudinal direction. The lateral sill, in particular an inner lateral sill profile facing the passenger compartment in this case has a substantially C-like profile geometry, wherein the second reinforcing element with its flange supports itself on an upper profile portion of the lateral sill protruding to the inside in the vehicle center. The second reinforcing element thus adjoins the inside of a lateral sill, supporting itself on said lateral sill in vehicle vertical direction.

In another exemplary embodiment, the lateral front wall portion adjoining the lateral sill forms a mounting for a cable harness or for such like functional components of the motor vehicle bounded in vehicle transverse direction to the inside by the second reinforcing element with the lateral sill. Insofar, the second reinforcing element has to be arranged spaced from the lateral front wall portion in such a manner that a depression or mounting suitable for receiving a cable harness is created. Such a hollow space that is accessible from the top is also advantageous with respect to production since a fastening tool, such as for example a welding tong can be introduced without problem for example for welding the individual components adjoining the mounting.

According to another exemplary embodiment, the second reinforcing element supports itself towards the front in travelling direction of the motor vehicle facing the wheel housing panel on the wheel housing panel via two flanges each protruding in vehicle transverse direction to the outside. In each case protruding to the outside in vehicle transverse direction in this case is to mean in particular that the two flange portions extend facing away from each other and with respect to the second reinforcing element to the outside in vehicle transverse direction. If for example the second reinforcing element assigned to the left side member, left lateral sill or left wheel housing panel is viewed, its left front connecting flange protrudes to the left, towards the lateral sill, while its right connecting flange adjoining the wheel housing panel protrudes to the right, in the direction of a center tunnel of an adjoining floor panel.

The second reinforcing element adjoining the wheel housing panel comprises a U-profile like contour having two lateral cheeks formed in the vehicle longitudinal and vehicle transverse axis, wherein the wheel housing panel substantially acts as closing plate for the second reinforcing element. Through its attachment to the wheel housing panel a substantially closed and accordingly structure-stiffening approximately box-like reinforcing structure can be provided, by means of which the first reinforcing element or the wheel housing panel and the nodal point of the side member adjoining thereto cannot only be supported and structurally reinforced in a concentrated form but over as large as possible an area towards the bottom.

According to another exemplary embodiment, the first reinforcing element comprises a top-hat profile like or C-profile like contour that is closed off by the wheel housing panel. The first reinforcing element in this case generally extends in an inside of the wheel housing panel facing the passenger cell. The first reinforcing element for example acting as frame head support or front frame extension thus protrudes into the vehicle interior and forms a structural connection between the middle front wall portion located between the lateral wheel housing panels and a lateral front wall portion adjoining the outer region of the wheel housing panels.

According to another exemplary embodiment, the second reinforcing element supports the first reinforcing element at least in a covering manner in sections against the travelling direction of the motor vehicle obliquely downwards on the floor structure of the vehicle body. Here, it is provided in particular that the second reinforcing element forms a covering region with the first reinforcing element and in the process substantially covers at least about 30%, generally about 50% of the cross-section profile of the first reinforcing element.

Through the mutually covering or overlapping arrangement of first and second reinforcing element, the transition region of the two reinforcing elements in particular can receive a structural reinforcement so that any forces that can be transmitted to the first reinforcing element via the front side member can be discharged into the floor structure in a particularly favorable manner via the second reinforcing element. In addition, the sheet metal thicknesses of the body components involved can also be advantageously reduced because of the structural reinforcement, so that altogether a weight reduction of the motor vehicle body can be achieved.

Here it is provided in particular that the second reinforcing element extends obliquely downwards facing away from the travelling direction between a reinforcing element and the floor structure of the motor vehicle body. Insofar, the second reinforcing element can provide a kind of reinforcing brace for the first reinforcing element, which is suitable in particular for transmitting forces acting in vehicle longitudinal direction.

According to another exemplary embodiment, it is also provided furthermore that the second reinforcing element comprises an area portion designed as resting ramp, which supports itself towards the top on the first reinforcing element and towards the bottom on a sill reinforcement located below the floor panel of the vehicle body. Said area portion extends with respect to the vehicle vertical direction obliquely upwards facing the first reinforcing element, in travelling direction of the motor vehicle towards the front.

The area portion in this case can form a resting ramp for a foot of the driver or co-driver of the motor vehicle. Insofar, the second reinforcing element can also provide a comfort function for the vehicle occupants in addition to its structurally reinforcing effect. In particular, the inclination of the area portion extending between the first reinforcing element and the floor structure can be matched to the comfort of the occupants.

Furthermore, the second reinforcing element can comprise two lateral cheeks located opposite each other and adjoining the area portion acting as resting ramp and substantially oriented parallel to each other and protruding downwards towards the floor structure. Those cheeks in this case are spaced from each other with respect to the vehicle transverse direction and on their end portions facing the wheel housing panel comprise the already mentioned flanges protruding to the outside, by means of which the reinforcing element can be structurally connected to the wheel housing panel.

The lateral cheek located on the outside with respect to the vehicle transverse direction furthermore comprises the flange extending to the outside and substantially in vehicle longitudinal direction, and thereby supports itself on a top side of a lateral sill profile. The lateral cheek located opposite, which faces the vehicle center, can be structurally connected, generally welded to a sill reinforcement that is L-shaped in cross section towards the bottom. The lateral cheek located inside in this case additionally forms a lateral stop for a lateral flange of a floor panel protruding towards the top, which generally adjoins the second reinforcing element above a lower end portion of the lateral cheek.

According to another exemplary embodiment, the flange of the second reinforcing element supporting itself on the lateral sill extends on a lower end portion of the lateral cheek of the second reinforcing element facing the lateral sill, which insofar can support itself on the lateral sill profile from the top. The area portion in particular designed as foot resting ramp and angularly adjoining the lateral cheek protrudes with an extension further downwards and with a further flange portion laterally adjoins the lateral sill, wherein that lateral flange portion approximately lies in the alignment of a substantially linear end between area portion and outer lateral cheek.

According to another exemplary embodiment, the second reinforcing element can also comprise at least one structure-reinforcing stamping or bead and/or at least one passage opening for a fastening tool, in particular for a welding tong, in its area portion designed as resting ramp. The stamping or bead of the area portion substantially designed flat can structurally reinforce said area portion, while the passage opening makes possible the introducing or guiding-through of a welding tong into the second reinforcing element, so that for example a flange portion of the first reinforcing element located below can be structurally connected, in particular welded to the wheel housing panel.

According to another exemplary embodiment, the second reinforcing element supports itself on the sill reinforcement with a cross member on the floor side in an overlapping manner with a lower flange adjoining the area portion designed as resting ramp. The cross member, the lateral sill and/or the sill reinforcement fastened thereto and protruding further to the inside in this case form the floor structure, on which the second reinforcing element supports itself obliquely downwards.

Here, it can be provided in particular, that the cross member on the floor side, which among other things comprises a main mounting hole for lifting the entire body, extends below the sill reinforcement and with a connecting flange comes to lie from below in a substantially covering manner with the lower connecting flange of the second reinforcing element, which adjoins the ramp-like area portion of the reinforcing element from below. The main mounting holes provided on the floor-side cross member make possible a defined mounting and conveying of the entire vehicle body, in particular during its production process.

This overlapping or covering arrangement of the lower flange of the second reinforcing element with a flange of the floor-side cross member provided below the sill reinforcement can provide a particularly stable and structural-reinforcing load-transmitting configuration.

According to another exemplary embodiment, it is also provided that the second reinforcing element comprises at least one, generally a plurality of flanges almost along its entire outer circumference and adjoining adjacent body components, in particular adjoining the first reinforcing element, the wheel housing panel, the lateral sill and/or the sill reinforcement. When, in particular, almost the entire outer contour of the second reinforcing element is provided with connecting flanges, it can be substantially non-releasably fastened almost all round adjoining body components.

For connecting the second reinforcing element, as well as all other body components, popular joining methods such as are usual in bodywork construction, for example spot welding or laser welding, but also gluing operations and riveting as well as penetration joining can be used as desired.

The first and the second reinforcement element together with the front side member and a front frame extension adjoining the front side member against the travelling direction and with the floor-side cross member form a frame structure that is closed within itself, wherein the first and the second reinforcing element, based on the vehicle transverse direction, provide a branching of the load path formed by the front side member and side member extension that is offset towards the outside. In this manner, depending on the direction of acting deformation forces, these can be absorbed in a parallelogram-like manner by the frame structure formed by the reinforcing elements, the front side member, the front frame extension and the floor-side cross member and discharged into the adjoining load-bearing structural components of the motor vehicle body.

Finally, in another exemplary embodiment, a motor vehicle having a vehicle body described before is provided.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 3 is an isolated perspective representation of the second reinforcing element;

FIG. 4 is a further isolated and perspective representation of the reinforcing element;

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
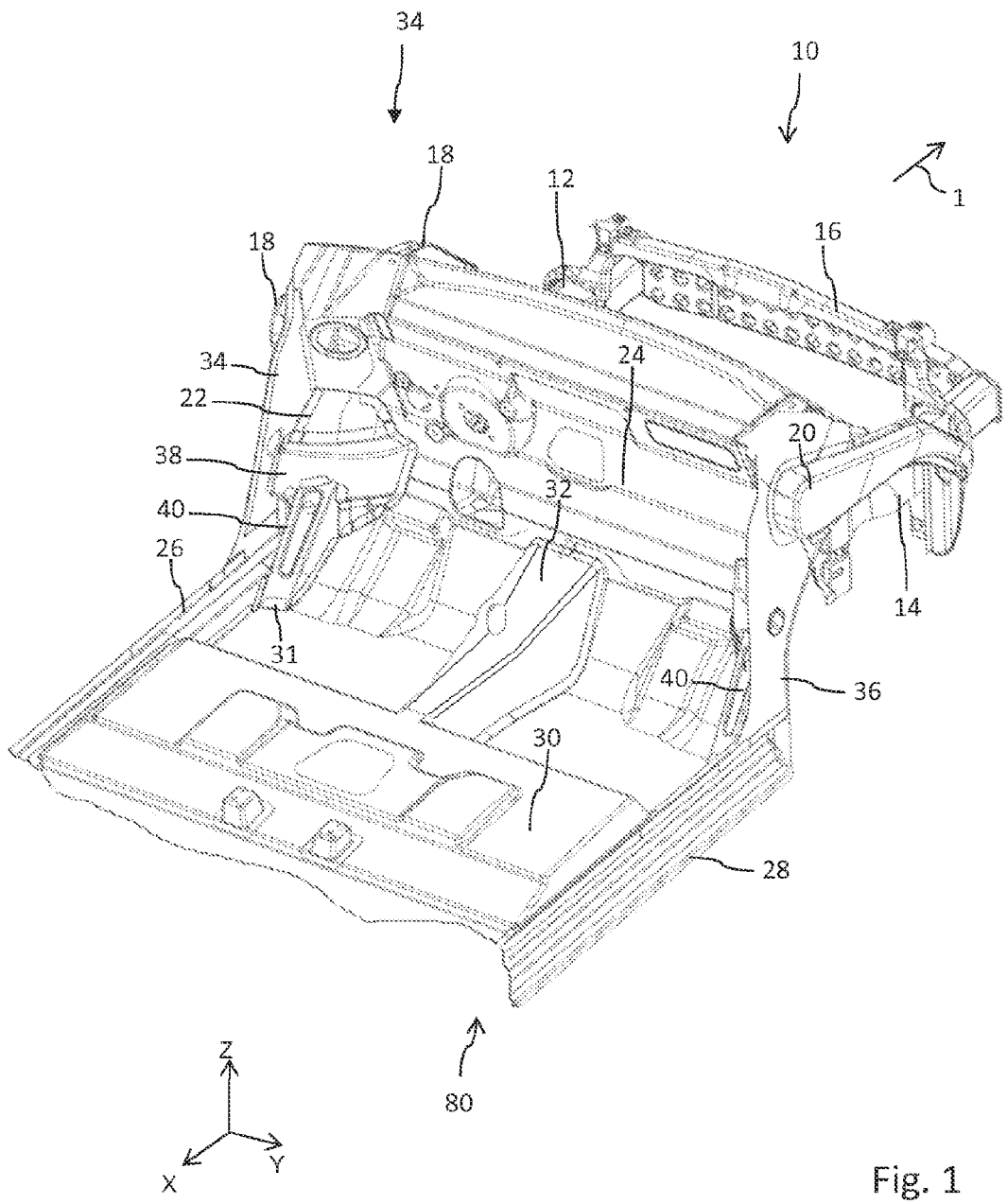
FIG. 1 is a perspective detail representation of the motor vehicle body in the front wall region.

The motor vehicle body 10 shown by regions in perspective representation in FIG. 1 comprises a front frame formed by two lateral front side members 12, 14 and a front bumper cross member 16, which on the rear end adjoins a front wall 24 separating the engine compartment and the passenger cell and merges into a floor structure 80 which with respect to the vehicle vertical direction (z) is located lower.

A middle portion, of the front wall 24 substantially extending in vehicle transverse direction (y) and vehicle vertical direction (z) adjoins, based on the vehicle transverse direction (y) in each case towards the outside, wheel housing panels 22 curved to the inside, of which in the present drawings merely the left wheel housing panel 22 is clearly shown. The wheel housing panel 22 is designed in one example in a lower transition region of front wall 24 and floor panel 30 facing the foot space of the body, while the front wall 24 above the wheel housing 22 merges into lateral front wall portions 34, 36 substantially extending in vehicle vertical direction (z) and in vehicle longitudinal direction (x). Outside the lateral front wall portions 34, 36, wheel installation braces 18, 20 extend, which stabilize and reinforce the vehicle body 10 above the wheel installation.

Adjoining the front wall 24 towards the bottom, a floor panel 30 with a center tunnel 32 is provided, which substantially fills out the intermediate space between lateral sills 26, 28 of the floor structure 80 extending in vehicle longitudinal direction.

Figure 2:
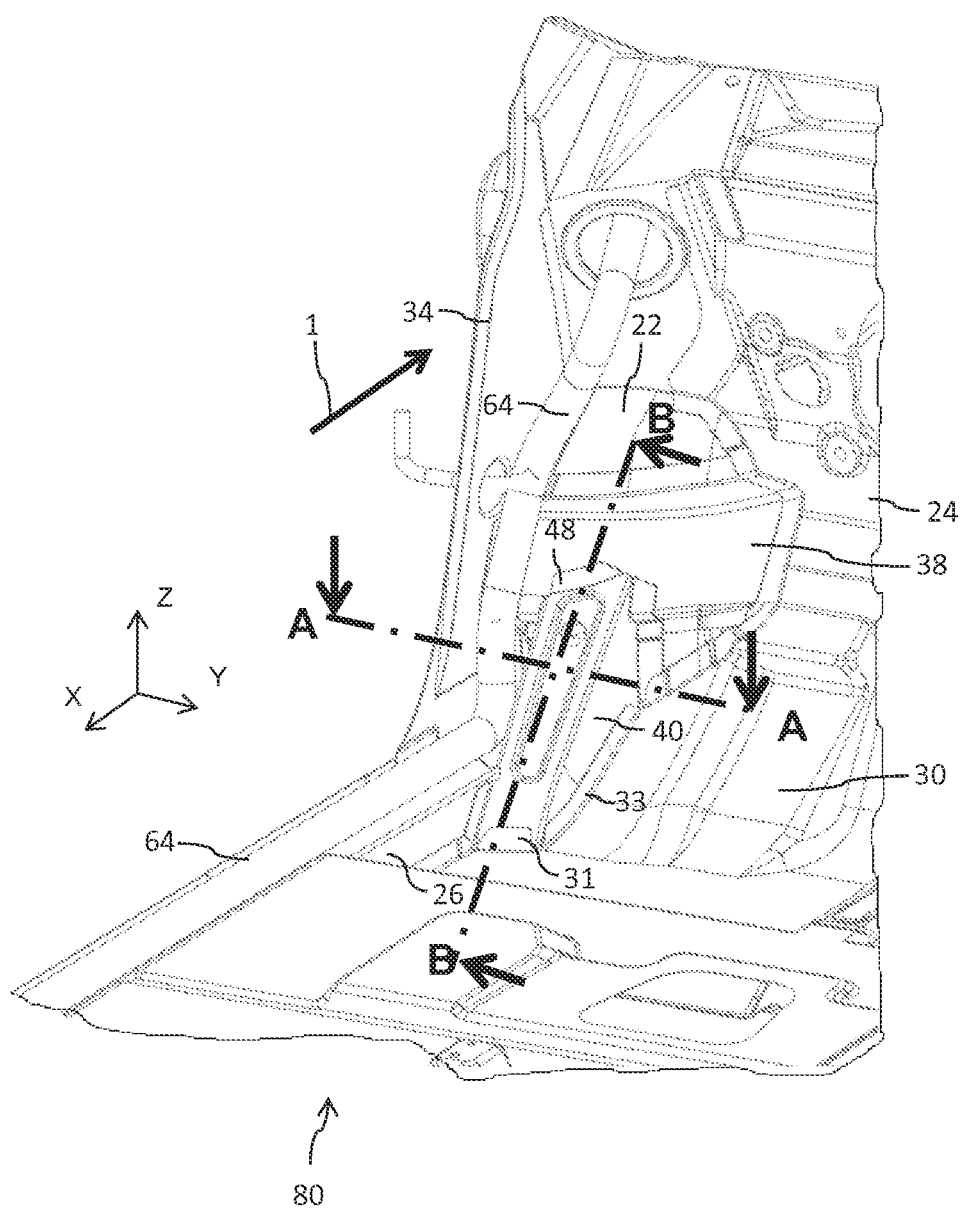
FIG. 2 is an enlarged representation of the body in the region of the left wheel housing panel.

In the enlarged representation according to FIG. 2, the lateral transition of the front wall 24 located outside or the front frame located in front thereof to the floor structure 80 which adjoins the front wall 24 at the rear and is located lower, is shown. In substantially horizontal extension of the front left side member 12, a first approximately C or top-hat profile like reinforcing element 38 protruding to the outside extends along the inside of the wheel housing panel 22. With an end located outside and facing away from the front side member 12, the first reinforcing element 38 in this case substantially adjoins the left lateral front wall portion 34.

The first reinforcing element 38 designed C-profile like in cross section thus substantially lies in the plane of the front frame formed by the two front side members 12, 14 and the bumper cross member 16.

Adjoining the first reinforcing element 38 towards the bottom, a second reinforcing element 40 is provided, which extends obliquely downwards towards the floor structure 80 and which supports the first reinforcing element 38 brace-like towards the bottom. The second reinforcing element 40 approximately designed ramp-like in this case is arranged spaced from the lateral front wall portion 34 in order to be able to install in one example, a cable harness 64 indicated in FIG. 2 between the lateral front wall portion 34 and the reinforcing element 40 above a lateral sill 26.

Figure 5:
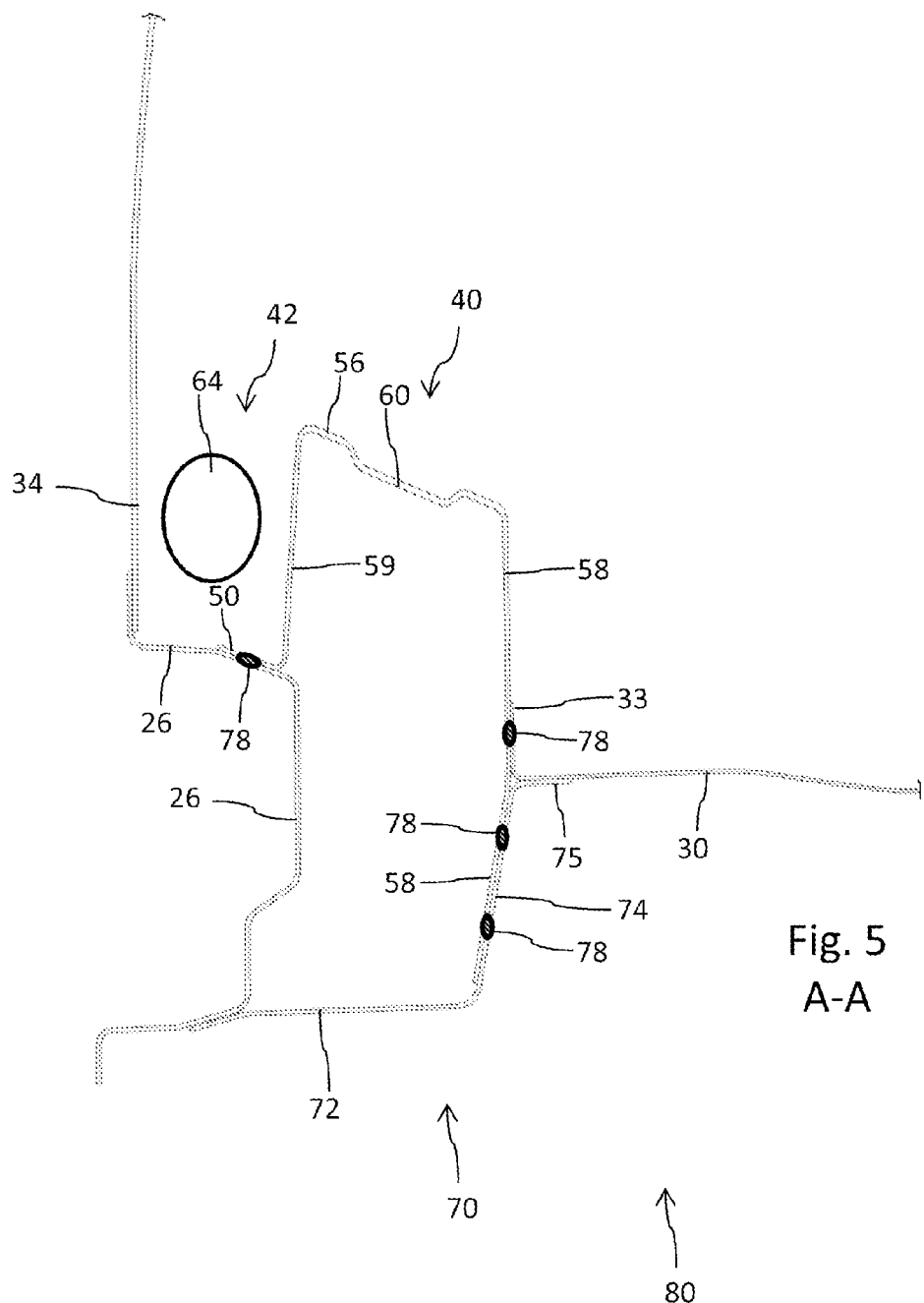
FIG. 5 is a cross-sectional representation along A-A according to FIG. 2.

In FIG. 5, a cross section along A-A making reference to FIG. 2 is shown. There it is evident that the lateral front wall portion 34 adjoins a profile of a lateral sill 26 formed approximately C-like towards the bottom. Spaced horizontally and in vehicle transverse direction (y) from this, the second reinforcing element 40 supports itself with a lateral cheek 59 and with a flange protruding approximately horizontally, in vehicle longitudinal direction (x) and in vehicle transverse direction (y) to the outside, on a top side of the lateral sill 26 protruding to the inside. Thus, a mounting 42 that is accessible from the top for a cable set 64 or cable harness of the motor vehicle can be provided by the top side of the lateral sill 26, the lateral front wall portion 34 and the lateral cheek 59 of the second reinforcing element 40.

Towards the inside, towards the vehicle center adjoining the lateral sills 26, a lateral sill reinforcement 70 is provided, which comprises a substantially L-shaped cross-sectional profile with a lower profile portion 72 and a lateral profile portion 74. The lower profile portion 72 in this case adjoins a lower side of the C-shaped profile of the lateral sill 26 protruding to the inside. Sill reinforcement 70 and lateral sill 26 in this case are generally structurally interconnected, in one example, welded together or otherwise joined together.

The lateral profile portion 74 protruding in vehicle vertical direction (z) comes to lie against a lateral cheek 58 of the second reinforcing component 40 located inside, as is evident from the cross section according to FIG. 5.

Furthermore, the profile portion 74 of the sill reinforcement 70 protruding upwards comprises a flange portion 75 protruding to the inside towards the vehicle center, on which a lateral margin of a floor panel 30 comes to lie. On its left lateral margin, the floor panel 30 comprises a flange 33 protruding upwards, via which it can be connected to the lateral cheek 58 of the second reinforcing component 40. Structural connections, in one example welds of the individual components are merely exemplarily and individually marked in all Figures with individual spot welds 78.

In addition to the two lateral cheeks 58, 59 substantially extending in vehicle longitudinal direction (x) and in vehicle vertical direction (z) and substantially oriented parallel to each other but offset in vehicle transverse direction (y) from each other, the second reinforcing element 40 additionally comprises an area portion 56 interconnecting the lateral cheeks 58, 59 and designed approximately ramp-like. That area portion 56 extends from the first reinforcing element 38 against the travelling direction 1 of the motor vehicle obliquely downwards and borders on the first reinforcing element 38 and on the sill reinforcement 70 in a supporting manner with corresponding flanges 48, 54. The area portion 56 approximately designed as foot rest ramp furthermore comprises a bead like stamping 60, which at the height of the first reinforcing element 38 comprises a passage opening 62 for a welding tool 66 shown in FIG. 6. The passage opening 62 makes it possible to connect, in one example, weld the first reinforcing element 38 with the wheel housing panel 22 only after an assembly of the second reinforcing element.

According to its isolated representations of FIGS. 3 and 4, the second reinforcing element 40 comprises two flange portions 44, 46 each protruding to the outside in vehicle transverse direction (y) relative to the reinforcing element 40, by means of which the second reinforcing element 40 can support itself over as large as possible an area on the inside of the wheel housing panel 22. The flange 46 facing to the outside towards the lateral front wall portion 34 extends adjoining the left lateral cheek 59, while the front flange 44 protruding to the inside towards the vehicle center and towards the center tunnel 32 is formed on the front end portion of the lateral cheek 58 located inside.

Figure 6:
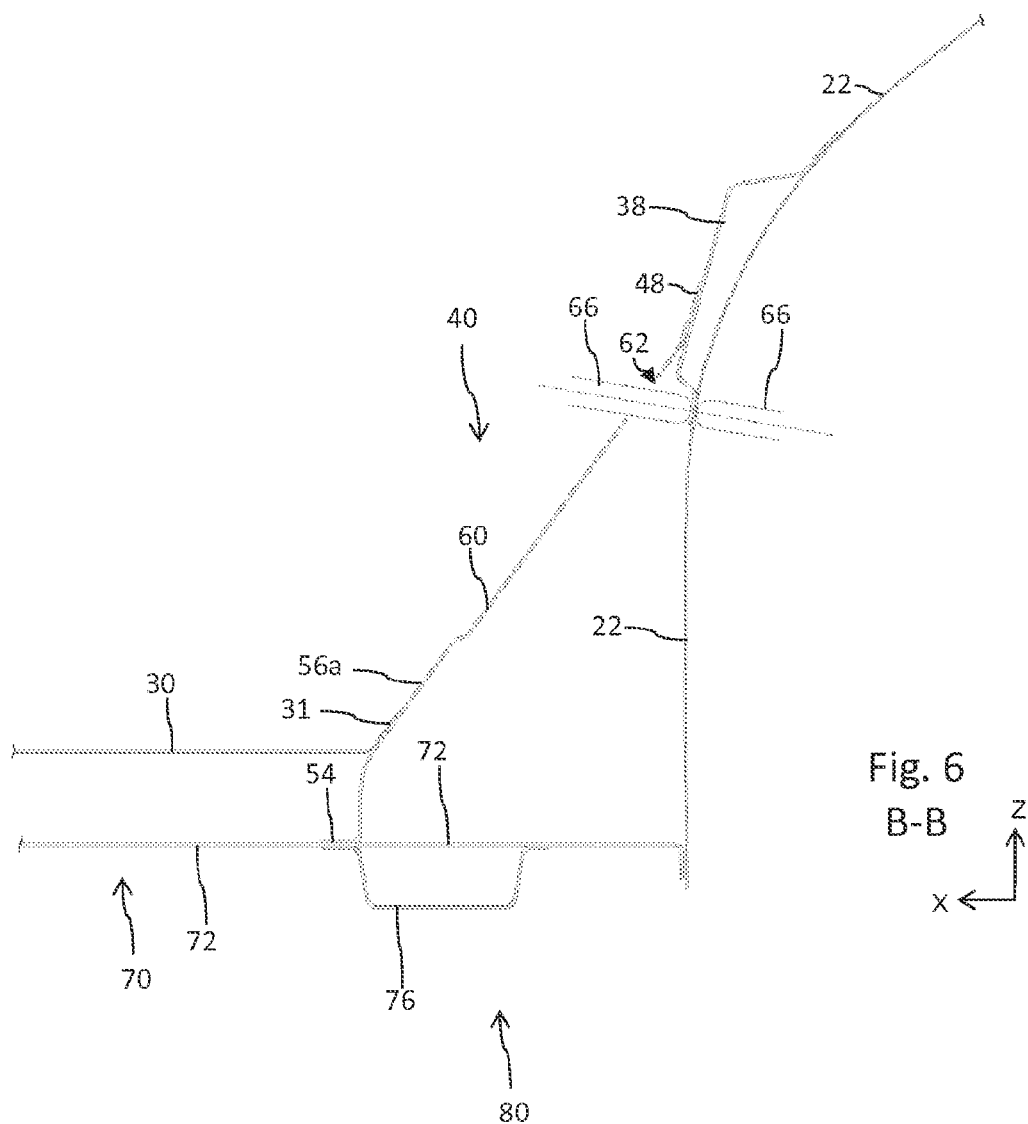
FIG. 6 is a cross section B-B according to FIG. 2.

From FIGS. 2 and 6 it is evident furthermore that an upper end portion of the second reinforcing element 40 is arranged in a widely overlapping and covering manner relative to the first reinforcing element 38. Insofar, upper end portions 44a, 46a of the front flange portions 44, 46 are geometrically 38 adapted to the cross-sectional contour of the first reinforcing element. The upper flange 48 designed as continuation of the area portion 56 comes to lie in a final assembly configuration at least in the lower third, if not even in approximately in the middle of the cross-sectional profile of the first reinforcing element 38.

Through the mutual arrangement overlapping or covering each other of the first and second reinforcing element 38, 40, the forces transmitted via the first reinforcing element 38 can be discharged to a high degree into the second reinforcing element 40 towards the bottom.

Viewing FIGS. 2 to 4 together, it is evident that the area portion 56 designed ramp-like comprises a lower portion 56a downwards, facing the floor structure 80 that goes beyond the lateral cheek 59, on the lower end of which a flange 54 is provided, which according to the representation according to FIG. 6 comes to lie on the floor portion 72 of the sill reinforcement 70. This lower flange 54 in this case comes to lie in a covering manner with a floor-side cross member 76 provided below the sill reinforcement 70, so that the forces that can be transmitted via the second reinforcing element 40 can be directly introduced into the floor-side cross member 76, which generally comprises main mounting holes for the lifting of the entire body.

Laterally and towards the outside as well as adjoining the lateral sill 26, the lower portion 56a of the ramp-like area portion 56 comprises a further flange 52, by means of which the second reinforcing element 40 can be connected to the lateral sill 26. The flange 52 adjoining the lateral sill 26 in this case extends, as shown in FIG. 3, substantially in an imaginary extension of a bending line 57 along which the lateral cheek 59 merges into the upper region of the ramp-like area portion 56.

Figure 7:
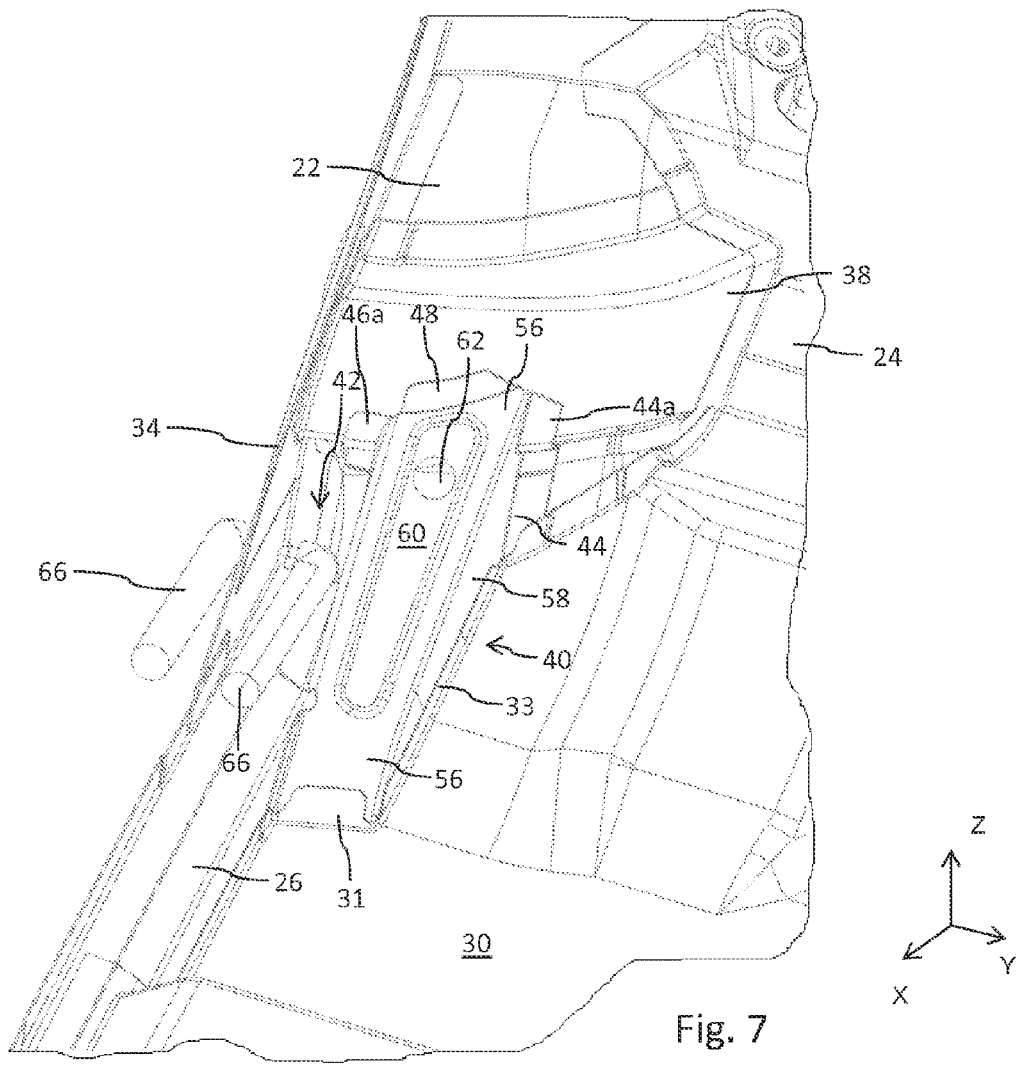
FIG. 7 is a further perspective representation of the second reinforcing element in installation position during the production process.

As is shown, furthermore, in FIG. 6, the floor panel 30 provided above the sill reinforcement 70 adjoins the ramp-like area portion 56 of the second reinforcing component 40 with a flange 31 protruding upwards, where it is generally structurally connected, in one example, welded to the latter. FIG. 7 finally shows the depression or mounting 42 formed by the second reinforcing element 40, the lateral front wall portion 34 and lateral sill 26 and which is accessible from the top, which in addition to receiving the cable set 64 sketched in FIG. 2, is also advantageous for assembly purposes, for example for introducing a welding tong 66.

By means of the second reinforcing element 40 and its function providing a brace-like support for the first reinforcing element 38, a reduction of the sheet metal thicknesses of remaining body components and panels can be achieved, so that altogether a weight saving of the vehicle body can result. Furthermore, the second reinforcing element 40 is adapted to adjoining body components, for example to the first reinforcing element 38, to the wheel housing panel 22, to the floor panel 30, to the lateral sill 26 and to the floor structure 80 in such a manner that altogether an optimized structural node between the lateral sill and the side members 12, 14 located in travelling direction in front of the front wall 24 can be created. Thus, the torsional stiffness and stability of the body 10 can be increased and an entering or intrusion behavior of the body upon a laterally offset frontal impact altogether improved.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A motor vehicle body, comprising:
   a front wall having a first side opposite a second side, the first side adapted to face an engine compartment, the front wall extending in a vehicle transverse direction;
   a wheel housing panel adjoining the front wall and having a contour;
   a floor structure coupled to the front wall;
   a lateral front wall portion adjoining the wheel housing panel and coupled to the front wall;
   at least one side member coupled to the first side of the front wall;
   a first reinforcing element coupled to the lateral front wall portion between the lateral front wall portion and the front wall, which, following the contour of the wheel housing panel, protrudes outwardly in the vehicle transverse direction; and
   a second reinforcing element that supports the first reinforcing element on the floor structure, the second reinforcing element arranged spaced from the lateral front wall portion.

2. The motor vehicle body according to claim 1, further comprising a lateral sill that extends in a vehicle longitudinal direction, wherein the second reinforcing element includes a first flange that protrudes outwardly in the vehicle transverse direction and substantially extends in the vehicle longitudinal direction, the first flange coupled to the lateral sill to support the second reinforcing element on the lateral sill.

3. The motor vehicle body according to claim 2, wherein the lateral front wall portion adjoining the lateral sill forms a mounting for a cable harness that is accessible from a top of the lateral sill and is bounded towards the inside by the second reinforcing element in vehicle transverse direction with the lateral sill.

4. The motor vehicle body according to claim 3, wherein the second reinforcing element includes two flanges that protrude outwardly in the vehicle transverse direction and the flanges support the second reinforcing element on the wheel housing panel towards the front in a vehicle travelling direction.

5. The motor vehicle body according to claim 4, wherein the first reinforcing element has a top-hat-like or C-like contour that is closed off by the wheel housing panel.

6. The motor vehicle body according to claim 5, wherein the second reinforcing element at least in sections supports the first reinforcing element in a covering manner against the vehicle travelling direction obliquely downwards on the floor structure.

7. The motor vehicle body according to claim 6, wherein the second reinforcing element further comprises an area portion designed as a resting ramp, and the area portion is supported at a first end on the first reinforcing element and at a second end on a sill reinforcement located below a floor panel.

8. The motor vehicle body according to claim 7, wherein the second reinforcing element further comprises two lateral cheeks located opposite each other and adjoining the area portion, the two lateral cheeks being substantially aligned parallel to each other and protruding downwards towards the floor structure.

9. The motor vehicle body according to claim 8, wherein the first flange extends on a lower end portion of the lateral cheek facing the lateral sill.

10. The motor vehicle body according to claim 9, wherein the second reinforcing element in the region of the area portion designed as a resting ramp, further comprises at least one structure-reinforcing stamping.

11. The motor vehicle body according to claim 9, wherein the second reinforcing element in the region of the area portion designed as a resting ramp, further comprises a passage opening for a fastening tool.

12. The motor vehicle body according to claim 10, wherein the second reinforcing element further comprises a floor-side cross member that includes a flange adjoining the area portion designed as a resting ramp.

13. The motor vehicle body according to claim 12, wherein the lateral sill further comprises a sill reinforcement, and the floor-side cross member extends below the sill reinforcement and comprises at least one main mounting hole for lifting the motor vehicle body.

14. The motor vehicle body according to claim 13, wherein the second reinforcing element comprises an outer circumference and at least one flange along the outer circumference for connecting to at least one of the first reinforcing element, the wheel housing panel, the lateral sill and the sill reinforcement.

15. A motor vehicle, comprising:
   a motor vehicle body including a front wall having a first side opposite a second side, the first side adapted to face an engine compartment, the front wall extending in a vehicle transverse direction;
   a wheel housing panel adjoining the front wall and having a contour;
   a floor structure coupled to the front wall;
   a lateral front wall portion adjoining the wheel housing panel and coupled to the front wall;

at least one side member coupled to the first side of the front wall;

a first reinforcing element coupled to the lateral front wall portion between the lateral front wall portion and the front wall, which, following the contour of the wheel housing panel, protrudes outwardly in the vehicle transverse direction; and a second reinforcing element that supports the first reinforcing element on the floor structure, the second reinforcing element arranged spaced from the lateral front wall portion, wherein the second reinforcing element comprises an outer circumference and at least one flange along the outer circumference for connecting to at least one of the first reinforcing element, the wheel housing panel, the lateral sill and the sill reinforcement.

16. The motor vehicle according to claim 15, further comprising a lateral sill that extends in a vehicle longitudinal direction, wherein the second reinforcing element includes a first flange that protrudes outwardly in the vehicle transverse direction and substantially extends in the vehicle longitudinal direction, the first flange coupled to the lateral sill to support the second reinforcing element on the lateral sill.

17. The motor vehicle according to claim 16, wherein the lateral front wall portion adjoining the lateral sill forms a mounting for a cable harness that is accessible from a top of the lateral sill and is bounded towards the inside by the second reinforcing element in vehicle transverse direction with the lateral sill.

18. The motor vehicle according to claim 17, wherein the second reinforcing element includes two flanges that protrude outwardly in the vehicle transverse direction and the flanges support the second reinforcing element on the wheel housing panel towards the front in a vehicle travelling direction.

19. The motor vehicle according to claim 18, wherein the first reinforcing element has a top-hat-like or C-like contour that is closed off by the wheel housing panel.

20. The motor vehicle according to claim 19, wherein the second reinforcing element at least in sections supports the first reinforcing element in a covering manner against the vehicle travelling direction obliquely downwards on the floor structure.

* * * * *